L. I. JONES.
PNEUMATIC TIRE PROTECTOR.
APPLICATION FILED JULY 29, 1919.

1,371,097.

Patented Mar. 8, 1921.

Inventor
Lemuel I. Jones
By Walter W. Calmore
Attorney

UNITED STATES PATENT OFFICE.

LEMUEL I. JONES, OF BOWLING GREEN, OHIO.

PNEUMATIC-TIRE PROTECTOR.

1,371,097.

Specification of Letters Patent.

Patented Mar. 8, 1921.

Application filed July 29, 1919. Serial No. 313,973.

*To all whom it may concern:*

Be it known that I, LEMUEL I. JONES, a citizen of the United States, residing at Bowling Green, in the county of Wood and State of Ohio, have invented certain new and useful Improvements in Pneumatic-Tire Protectors, of which the following is a specification.

This invention relates to a protector, or liner, for pneumatic tires.

The object of the invention is to provide a protector, or liner, consisting of rubber, embedded in which is a sheet of fabric, the rubber being of sufficient thickness and strength to act as a support to prevent the fabric of the casing from being broken from hard blows, due to striking objects in the roadway, and which will deflect tacks, nails, and like objects, which penetrate the outer casing, thus preventing the objects from reaching the inner tube.

Figure 1:
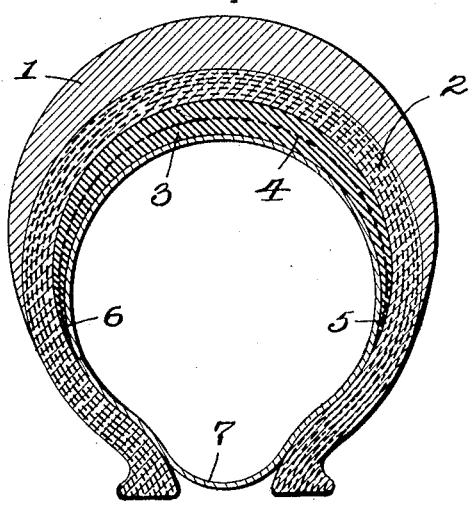
Figure 1 is a sectional view through an automobile tire casing, protector and inner tube.

Referring to Fig. 1 of the drawing, 1 is the outer casing of an automobile tire, which is of the usual construction and is made of rubber and fabric 2. 7 is the inner tube and between this inner tube and the outer casing is located my improved protector, which may be of a comparatively firm and elastic section of rubber 3, which partially encircles the inner tube and conforms to the shape of the inner surface of the casing. The protector is thick at the center and tapers in cross section toward each edge, as clearly shown in Fig. 2. Embedded in the rubber is a sheet of fabric 4, which may be of the woven or cord type. This fabric is impregnated with rubber and is located in the center of the protector and extends from one extreme edge to the other so that there is substantially the same amount of rubber on one side of the fabric as on the opposite side. This is important, as it allows the protector to bend without, in any way, straining the reinforcing sheet of fabric, and without disturbing the relation of the rubber to the fabric.

When the protector is located in position in the casing and the inner tube of the tire is inflated, the protector will yield with the casing, and the protector being independent of the casing, will deflect any tacks, nails, &c., that may penetrate the casing, preventing puncturing of the inner tube.

Figure 2:
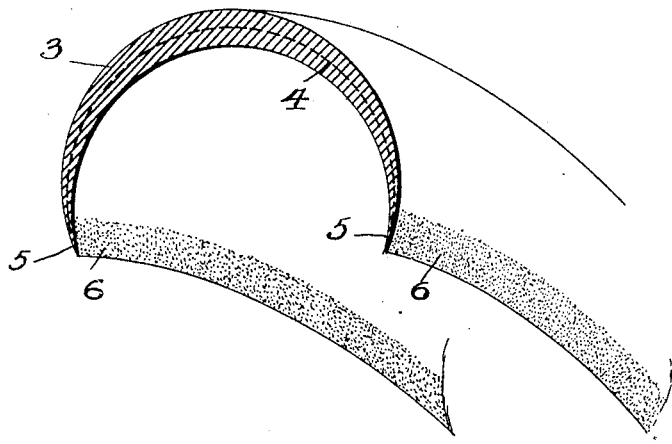
Fig. 2 is a sectional perspective view of the protector.

In some instances I may overlap the edges with a fabric, as at 6, Fig. 2, so as to prevent the tearing of the edges of the protector when changing the protector from one casing to another.

When a nail penetrates the outer casing, the reinforce is substantial enough to deflect, or bend, a nail. This is primarily due to the fact that the protector is under compression between the inner tube and the casing, making it difficult for any object to penetrate it, while both the inner tube and the casing are stretched due to the inflation of the inner tube.

What I claim is—

1. A protector adapted to be located between the inner tube and the outer casing of an automobile tire, said protector being made of firm rubber, thick at the center and tapered toward each edge; and a reinforcing sheet of fabric located centrally in the rubber and extending from edge to edge of the protector.

2. A protector adapted to be located between the inner tube and the outer casing of an automobile tire, said protector being made of firm rubber, thick at the center and tapering toward each edge; and a reinforcing strip of fabric centrally located in the protector and extending from edge to edge thereof, said protector having a reinforcing strip of fabric at each edge.

In testimony whereof I affix my signature.

LEMUEL I. JONES.